(12) United States Patent
Shmulevich et al.

(10) Patent No.: US 12,052,636 B1
(45) Date of Patent: Jul. 30, 2024

(54) CONTAINER LOCATION AND STATUS TRACKING DEVICE

(71) Applicant: Amazon Technologies, Inc., Seattle, WA (US)

(72) Inventors: Roman Shmulevich, Snohomish, WA (US); Gaurav Kumar, Bellevue, WA (US); John Allan Janusson, Mercer Island, WA (US); Xingang Guo, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 17/935,986

(22) Filed: Sep. 28, 2022

(51) Int. Cl.
*H04W 4/029* (2018.01)
*G08B 5/36* (2006.01)

(52) U.S. Cl.
CPC .............. *H04W 4/029* (2018.02); *G08B 5/36* (2013.01)

(58) Field of Classification Search
CPC ................................ H04W 4/029; G08B 5/36
See application file for complete search history.

(56) References Cited

U.S. PATENT DOCUMENTS

| | | | | |
|---|---|---|---|---|
| 9,730,178 | B1* | 8/2017 | Syrjälahti | H04L 67/52 |
| 10,121,034 | B1* | 11/2018 | Bathurst | G06K 7/10 |
| 10,438,030 | B2* | 10/2019 | Ramon | G06K 19/07758 |
| 10,776,526 | B2* | 9/2020 | Shelnutt | G06F 21/6218 |
| 10,997,830 | B1* | 5/2021 | Thayer | B07C 3/14 |
| 11,507,919 | B1* | 11/2022 | Colucci | H02J 50/90 |
| 2016/0379179 | A1* | 12/2016 | Roisen | G06Q 10/30 |
| | | | | 705/308 |
| 2022/0127073 | A1* | 4/2022 | Pai | B65D 81/18 |

* cited by examiner

*Primary Examiner* — John A Tweel, Jr.
(74) *Attorney, Agent, or Firm* — Eversheds Sutherland (US) LLP (57) ABSTRACT

A system includes a location controller for a building, a container arranged to store items, and a device attached to the container. The device includes a first radio and a light emitting diode. The first radio emits a signal. The location controller determines a first location of the device in the building based on the signal and communicates, based on the first location of the device in the building, a first instruction to the device indicating that the device should be moved to a second location. The light emitting diode emits light of a first color in response to the first instruction.

20 Claims, 9 Drawing Sheets

CONTAINER LOCATION AND STATUS TRACKING DEVICE

BACKGROUND

The present disclosure relates to location tracking and monitoring, and more specifically, to a container location and status tracking device.

DETAILED DESCRIPTION

A building may house containers adapted for various purposes. For example, a warehouse may house containers that are used to store items in the warehouse. These containers may be moved to different locations in and around the warehouse (e.g., to load items into the container, to move items to certain locations, or to store the items). In existing warehouses, robots may be used to move the containers, but it may be difficult for robots to locate specific containers on their own. For example, it would be inefficient and slow for a robot to approach each container to see if that container is the one that the robot is supposed to move. This problem becomes even more difficult when different robots move a container without informing or notifying other robots about the container's last location.

The present disclosure describes a device that attaches to containers and provides several features that assist the robots to track the location of the containers in a building (e.g., a warehouse). The device may also include radios (e.g., an ultra-wideband radio and a Bluetooth radio) that allow the device to report its location to a location tracking system. The reported location may be used to guide robots to the container. Moreover, the device may include various sensors (e.g., a fill sensor, temperature sensor, humidity sensor, motion sensor, etc.) that allow the device to detect certain aspects of the container or the environment around the container. Additionally, the device includes a lighting system that emits lights indicating the status of the container. For example, if the container has been moved to an incorrect location, the lighting system may emit light of a first color, and if the container has been subjected to high temperatures, then the lighting system may emit light of a second, different color. The lighting system may also emit different patterns of light to indicate different statuses. For example, the lighting system may emit flashing lights or solid lights. As another example, the lighting system may emit light that flashes at different frequencies or that flashes according to different patterns.

Figure 1:
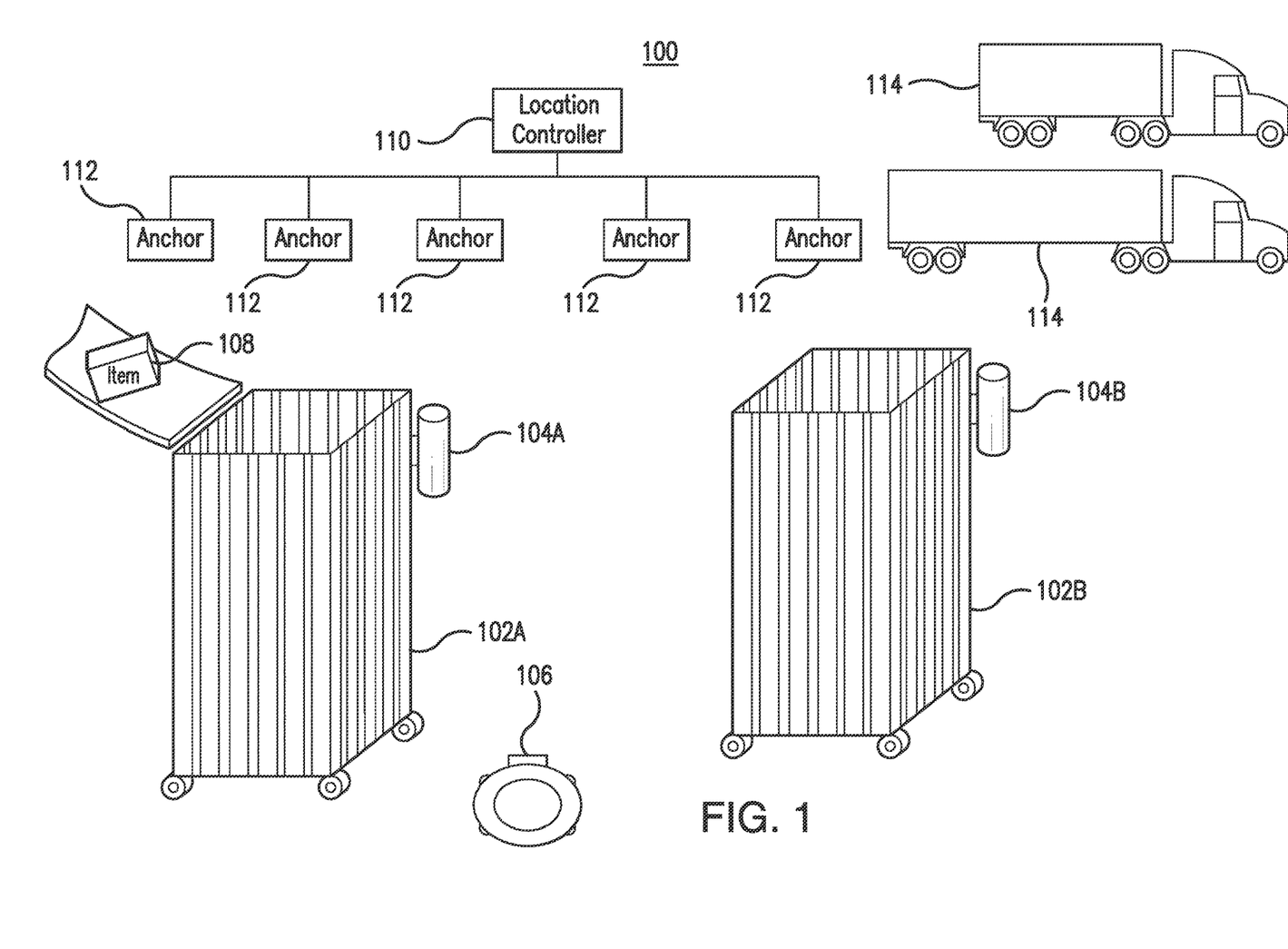
FIG. 1 illustrates an example system.

FIG. 1 illustrates an example system 100. As seen in FIG. 1, the system 100 includes one or more containers 102, one or more devices 104, one or more robots 106, one or more items 108, a location controller 110, one or more anchors 112, and one or more trucks 114. Generally, the system 100 may be a building or warehouse in which the items 108 are sorted or stored in the containers 102. In particular embodiments, the devices 104 allow the containers 102 to be tracked and monitored.

The containers 102 may be shaped to hold and transport items 108 throughout the system 100. For example, the sides of the containers 102 may be formed using gratings or fencing that prevent the items 108 within the containers 102 from falling out of the containers 102. The containers 102 may include an open top through which items 108 may enter the containers 102. Additionally, the containers 102 may include wheels that allow the containers 102 to be moved throughout the system 100. The system 100 may include any suitable number of containers 102. In the example of FIG. 1, the system 100 includes a container 102A and a container 102B. Each of the containers 102A and 102B may hold or store items 108 in the system 100. In one embodiment, the container 102 is a cart.

The devices 104 may attach to the containers 102. The devices 104 may include clips, ties, or arms that allow the devices 104 to attach and detach from the containers 102. The devices 104 may attach to any suitable object and not merely the containers 102. For example, the devices 104 may attach to specific items 108, pallets, boxes, or shelves. Each of the devices 104 may include various radios and sensors that allow the locations and statuses of the associated containers 102 in the system 100 to be tracked and monitored.

The devices 104 may include an ultra-wideband radio that serves as a beacon by emitting signals. These signals may be detected by one or more of the anchors 112 positioned throughout the system 100. As discussed below, based on which of the anchors 112 detected an emitted signal, the location controller 110 may determine the location of the device 104 and the container 102 to which the device 104 is attached. As the container 102 is moved throughout the system 100, the device 104 may continue to emit signals that the location controller 110 may use to update the location of the device 104 and the container 102. When the device 104 or the container 102 is moved to a location where the anchors 112 cannot detect the signals emitted by the device 104 (e.g., moved more than 25 meters away from the anchors 112 or moved to a space blocked by walls such as the inside of the truck 114), the device 104 may use another radio (e.g., a Bluetooth radio) to establish a connection in that location. For example, when the device 104 or the container 102 is moved onto a truck 114, the anchors 112 may stop receiving signals emitted by the device 104 and the device 104 may detect that a Bluetooth device or system on the truck 114 is within range. The device 104 may establish a Bluetooth connection to the Bluetooth device or system in the truck 114, and the location controller 110 may determine that signals from the device 104 are not being detected by the anchors 112. The device 104 uses the Bluetooth connection to update the location of the device 104 or the container 102, and the location controller 110 learns that the device 104 is located on the truck 114. In this manner, the device 104 may allow the location of the container 102 to be tracked and monitored.

The device 104 may include multiple sensors that monitor different aspects of the container 102 or the environment around the container 102. For example, the device 104 may include a fill sensor that detects if the container 102 is full with items 108. As another example, the device 104 may include a temperature sensor or a humidity sensor that detects an ambient temperature or humidity of the environment around the container 102. As another example, the device 104 may include a motion sensor that detects when the container 102 is moving. In this manner, the device 104 allows the status of the container 102 to be tracked and monitored.

The robot 106 may move autonomously throughout the system 100. In certain embodiments, the robot 106 moves the containers 102 around the system 100. For example, a robot 106 may receive an instruction to move a container 102 to a loading area. In response, the robot 106 may move underneath the container 102 and grab or lift the container 102. The robot 106 may then move towards the loading area to move the container 102 to the loading area. When the robot 106 reaches the loading area, the robot 106 may release or lower the container 102. The container 102 may then be loaded with items 108 at the loading area.

In certain embodiments, the location controller 110 tracks the locations of the containers 102 in the system 100 and then informs the robot 106 about the location of particular containers 102. Accordingly, when the robot 106 is instructed to move a particular container 102, the location controller 110 may inform the robot 106 about the location of the container 102. The robot 106 may then move to that location to move the container 102. The device 104 attached to the container 102 may then update the location of the device 104 or the container 102 with the location controller 110. In this manner, the robot 106 need not track and remember the location of every container 102 in the system 100 and instead rely on the location controller 110 for container location information. Specifically, different robots 106 may move a container 102 to different locations at different times, and the robots 106 may still know where the container 102 is located without individually tracking the location of the container 102.

The items 108 may be any objects that fit within the containers 102. For example, the items 108 may include boxes and packages that are loaded into the containers 102. In some embodiments, the system 100 includes a loading area where the items 108 are loaded into containers 102. After the items 108 are loaded into the containers 102, the containers 102 may be moved into other portions of the system 100. For example, the containers 102 may be moved onto trucks 114 so that the items 108 may be delivered. As another example, the containers 102 may be moved to a storage area in the system 100 where the items 108 are stored.

The location controller 110 uses one or more of the anchors 112 to track and monitor the locations of the containers 102 in the system 100. The anchors 112 may be ultra-wideband anchors that are distributed across different locations throughout the system 100. Each of the anchors 112 are in communication with the location controller 110. Each of the anchors 112 may include a receiver that detects and receives signals emitted by the devices 104. When the devices 104 emit a signal (e.g., using an ultra-wideband radio), certain anchors 112 sufficiently near the device 104 may detect the emitted signal. These signals may include an identifier for the emitting device 104 and a timestamp indicating when the signal was transmitted. When the anchors 112 detect the signal, the anchors 112 may alert the location controller 110 of the detected signal. Each anchor 112 may also include a timestamp in the alert that indicates when the anchor 112 received the emitted signal. Based on the locations of the anchors 112 that detected the emitted signal, the location controller 110 may determine the position or location of the device 104 that emitted the signal. For example, the location controller 110 may use the timestamps indicating when the signal was emitted and when the signal was received by each anchor 112 to determine an amount of time it took for the signal to reach the different anchors 112. Based on this information, the location controller 110 may determine the distance between the emitting device 104 and each anchor 112. This distance information may be used (e.g., through multilateration) to determine the location of the emitting device 104 (e.g., the coordinates of the device 104). The location controller 110 may then determine and update the location of the device 104 and the location of the container 102 to which the device 104 is attached. In this manner, the location controller 110 tracks and monitors the locations of the devices 104 and the containers 102 in the system 100.

The location controller 110 may also communicate instructions to the device 104. The location controller 110 may communicate these instructions to an anchor 112 that is near the device 104, and the anchor 112 may communicate the instructions to the device 104. In some embodiments, the device 104 uses a different radio to receive the instructions from the anchor 112. For example, the anchor 112 and the device 104 may use Bluetooth radios to communicate instructions from the anchor 112 to the device 104. The location controller 110 may communicate any suitable instructions to the device 104. For example, the location controller 110 may instruct the device 104 to where the device 104 and the container 102 should move (e.g., move to a particular truck 114 or to a loading area). As another example, the location controller 110 may instruct the device 104 whether the device 104 and the container 102 should be rotated to a particular orientation.

The trucks 114 may hold containers 102 and items 108 for delivery. When a container 102 has been loaded with items 108, the containers 102 may be moved onto the trucks 114. The robots 106 may move the containers 102 onto the trucks 114, or human operators may push the containers 102 onto the trucks 114. In some embodiments, the devices 104 include a radio (e.g., a Bluetooth radio) that connects with another device on the truck 114 so that the device 104 may continue to update its location even when the device 104 is out of range of the anchors 112 (e.g., located in the truck 114 or is in transit in the truck 114).

Figure 2:
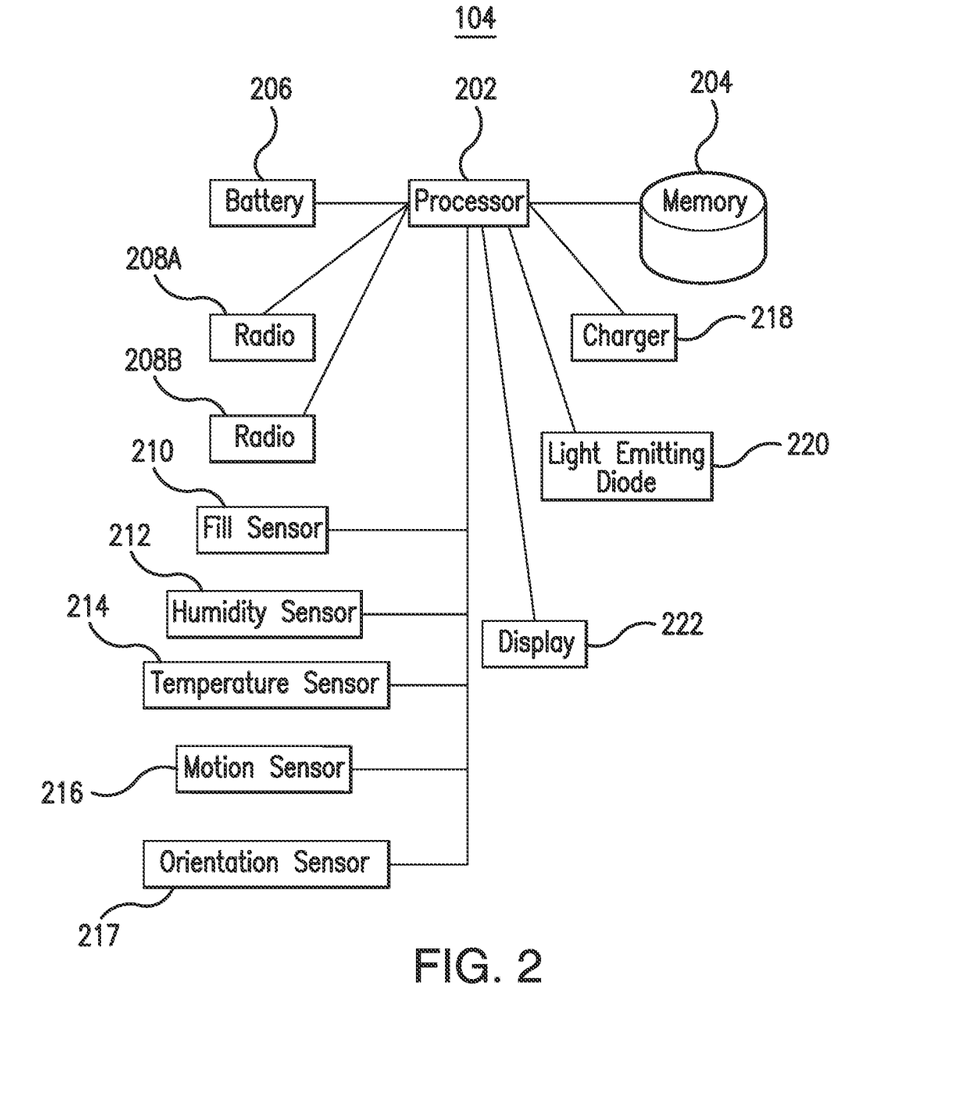
FIG. 2 illustrates an example device in the system of FIG. 1.

FIG. 2 illustrates an example device 104 in the system of FIG. 1. As seen in FIG. 2, the device 104 includes a processor 202, a memory 204, a battery 206, one or more radios 208, a fill sensor 210, a humidity sensor 212, a temperature sensor 214, a motion sensor 216, an orientation sensor 217, a charger 218, a light emitting diode 220, and a display 222. Generally, the components of the device 104 operate together so that the location and status of the device 104 may be tracked and monitored. The processor 202 and the memory 204 may control the operation of the device 104.

The processor 202 may include any suitable components that allow the other components of the device 104 to operate. For example, the processor 202 may include a general processor that processes software instructions that control the operation of the other components of the device 104. The processor 202 may also include a power controller that controls where electric power from the battery 206 is directed.

The processor 202 is any electronic circuitry, including, but not limited to one or a combination of microprocessors, microcontrollers, application specific integrated circuits (ASIC), application specific instruction set processor (ASIP), and/or state machines, that communicatively couples to memory 204 and controls the operation of the device 104. The processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 202 may include other hardware that operates software to control and process information. The processor 202 executes software stored on the memory 204 to perform any of the functions described herein. The processor 202 controls the operation and administration of the device 104 by processing information (e.g., information received from the location controller 110, trucks 114, and memory 204). The processor 202 is not limited to a single processing device and may encompass multiple processing devices.

The memory 204 may store, either permanently or temporarily, data, operational software, or other information for the processor 202. The memory 204 may include any one or a combination of volatile or non-volatile local or remote devices suitable for storing information. For example, the memory 204 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 204, a disk, a CD, or a flash drive. In particular embodiments, the software may include an application executable by the processor 202 to perform one or more of the functions described herein.

The battery 206 stores electrical energy to be used by other components of the device 104. For example, the battery 206 may be a lithium ion battery that stores electrical energy for other components of the device 104. In some embodiments, the processor 202 may control where electrical energy from the battery 206 is directed. For example, when the processor 202 determines that a particular component of the device 104 should be used, the processor 202 may direct electrical energy from the battery 206 to that component. When the processor 202 determines that a particular component of the device 104 should not be used, the processor 202 may stop electrical energy from being provided to that component.

The device 104 includes one or more radios 208 that the device 104 uses to transmit and receive messages (e.g., to update the location or status of the device 104). In the example of FIG. 2, the device 104 includes a radio 208A and a radio 208B. The device 104 may include any suitable number of radios 208. The radios 208A and 208B may communicate using different protocols. For example, the radio 208A may be an ultra-wideband radio that emits beacons. These beacons may be detected to track and update the location of the device 104. The radio 208B may be a Bluetooth radio that forms Bluetooth connections with other components. For example, the Bluetooth radio may form a Bluetooth connection when the device 104 is loaded onto a truck and is away from an ultra-wideband system. As another example, the Bluetooth radio may form a Bluetooth connection with a Bluetooth radio in an anchor 112. The location controller 110 may communicate instructions to the device 104 through the anchor 112 using this Bluetooth connection. The device 104 may include other types of radios. For example, the device 104 may include a radio frequency identification (RFID) radio or antennae. The RFID radio may be used to transmit an identifier for the device 104.

The fill sensor 210 may detect when a container to which the device 104 is attached has been filled to capacity. The fill sensor 210 may include any suitable components that can detect a fill level of a container. For example, the fill sensor 210 may include an optical emitter that emits an optical beam at a particular point of the container. When the container has been filled to that point, the items may break the optical beam and the fill sensor 210 detects that the container has been filled to capacity. As another example, the fill sensor 210 may include a mechanical switch positioned at a point in the container. When the container has been filled to that point, the items may contact or hit the switch. In response, the fill sensor 210 may detect that the container has been filled to capacity. The fill sensor 210 may be directed at any suitable point on the container such that that point is identified as the fill point for the container. For example, if the items in the container are fragile, a lower point may be used as the fill point so that the container is considered filled at a lower level. If the items in the container are sturdy, a higher point may be used as the fill point so that the container is considered filled at a higher level.

The humidity sensor 212 detects an ambient humidity around the device 104. In some embodiments, the humidity sensor 212 detects a relative humidity of the environment around the device 104. By using the humidity sensor 212, the device 104 may track and monitor the humidity or relative humidity of the environment around the device 104 and the container 102 to which the device 104 is attached. This information may be used to determine the humidity levels to which the items in the container have been exposed.

The temperature sensor 214 detects an ambient temperature of the environment around the device 104. The information from the temperature sensor 214 may reveal whether the device 104 or the items in the container to which the device 104 is attached have been exposed to appropriate or extreme temperatures. For example, the information from the temperature sensor 214 may reveal whether produce items have been exposed to undesirably high temperatures or undesirably low temperatures.

The motion sensor 216 may detect when the device 104 is in motion. For example, the motion sensor 216 may include an accelerometer or an inertial motion sensor that detects when the device 104 is speeding up or slowing down. This information may be used to detect when the device 104 or a container to which the device 104 is attached is in motion. In some embodiments, when the processor 202 determines, based on the information from the motion sensor 216, that the device 104 has not been in motion for a particular length of time exceeding a threshold, the processor 202 may cause the device 104 to enter a sleep state to preserve electrical energy usage from the battery 206.

The orientation sensor 217 detects an orientation of the device 104 or the container 102 to which the device 104 is attached. For example, the orientation sensor 217 may detect a direction in which the device 104 or the container 102 is pointing. This information may be useful in determining whether the device 104 or the container 102 should be rotated (e.g., to point the door of the container 102 in a direction that makes it easier to unload the items 108 in the container 102).

The charger 218 is used to charge the battery 206. In some embodiments, the charger 218 is a wireless charger that includes inductive elements that charge the battery 206. For example, when a container to which the device 104 is attached is positioned in a loading area for items to be loaded into the container, the charger 218 may be positioned next to a charging dock or plate. An electrical current may then be induced into the charger 218 by the electrical dock or plate, which causes the battery 206 to charge. In some embodiments, the charger 218 includes a port through which the battery 206 may be charged by a hardwire connection. By using the charger 218, the battery 206 may be recharged so that the device 104 may continue being used.

The light emitting diode 220 provides visual indications of the status of the device 104 or the container to which the device 104 is attached. For example, the processor 202 may activate the LED 220 to produce lights of different colors that indicate the different statuses of the device 104 or the container to which the device 104 is attached. When the fill sensor 210 indicates that the container is full, the LED 220 may emit a light of a first color (e.g., blue) to indicate that the container should be moved away from the loading area or to a particular truck. When the container has been moved to the correct location or truck, the LED 220 may be deactivated to indicate that the container has been moved to the proper location or truck. If the container is moved to an improper location or truck, the processor 202 may activate the LED 220 to emit a light of a second color (e.g., red) to indicate that the container is at an improper location or truck. When information from the humidity sensor 212 or the temperature sensor 214 indicate that the items in the container have been exposed to undesirable levels of humidity or heat, the processor 202 may activate the LED 220 to emit light of a third color (e.g., orange) to indicate that the items have been exposed to undesirable environmental elements. When the light emitted by the LED 220 is observed by a robot or human, the color of the light may quickly indicate to the robot or human of a problem experienced by the container or the device 104. The robot or human may then quickly address this problem. For example, the robot or human may move the container to the appropriate location or truck. As another example, the robot or human may remove or discard items in the container.

The LED 220 may also emit different patterns of light to indicate different statuses. For example, the LED 220 may emit flashing lights or solid lights to indicate different statuses. As another example, the LED 220 may emit light that flashes at different frequencies or that flashes according to different patterns to indicate different statuses.

The display 222 may be viewable on an external surface of the device 104. For example, a human operator may view the display 222 when standing near the device 104. Generally, the display 222 may be used to present status and location information relating to the device 104 or the container to which the device 104 is attached. For example, the display 222 may present a message indicating that the container is full and to where the container should be moved (e.g., onto which truck the container should be moved). The human operator may view the display 222 and move the container to the correct location. As another example, the display 222 may present a message indicating that the items in the container have been exposed to undesirably high heat levels. The human operator may view the display 222 and discard the items in the container.

Figure 3:
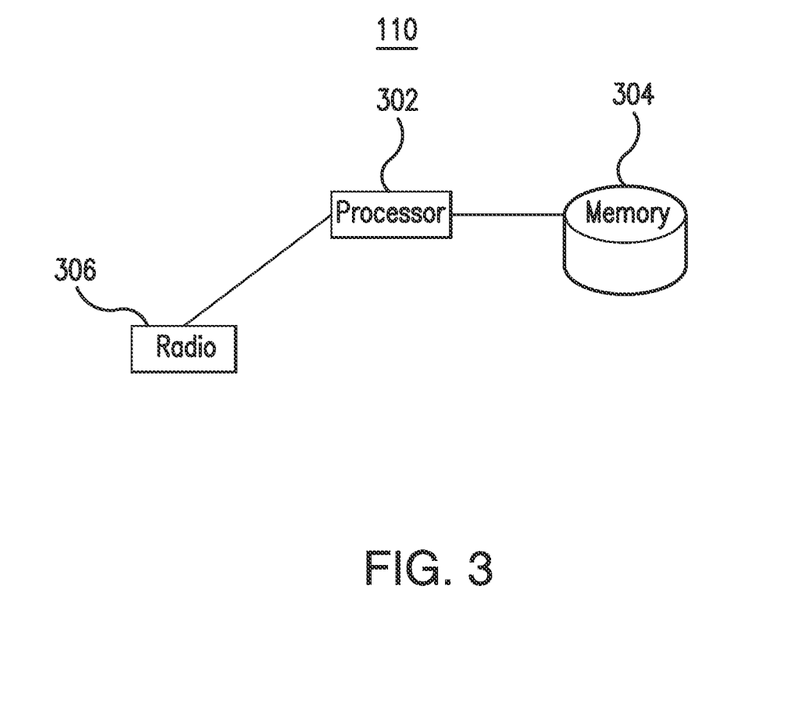
FIG. 3 illustrates an example location controller in the system of FIG. 1.

FIG. 3 illustrates an example location controller 110 in the system 100 of FIG. 1. As seen in FIG. 3, the location controller 110 includes a processor 302, a memory 304, and a radio 306. The processor 302, memory 304, and radio 306 operate to control the operation of the location controller 110. In particular embodiments, the location controller 110 tracks and monitors the locations of devices in the system 100.

As discussed previously, the controller 110 may be connected to one or more anchors positioned around the system 100. The location controller 110 may form hardwire connections with the anchors, or the location controller 110 may form wireless connections with the anchors using the radio 306. The radio 306 may form any suitable connections with the anchors in the system 100. When one or more of the anchors detect an emitted beacon, the anchors may communicate an indication of the detected beacon through these connections to the location controller 110. The location controller 110 may analyze the indication of the emitted beacon to determine the location of a device that emitted the beacon. The location controller 110 may then store or update the location of the device in the memory 304.

The processor 302 is any electronic circuitry, including, but not limited to one or a combination of microprocessors, microcontrollers, application specific integrated circuits (ASIC), application specific instruction set processor (ASIP), and/or state machines, that communicatively couples to memory 304 and controls the operation of the location controller 110. The processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 302 may include other hardware that operates software to control and process information. The processor 302 executes software stored on the memory 304 to perform any of the functions described herein. The processor 302 controls the operation and administration of the location controller 110 by processing information (e.g., information received from the devices 104, anchors 112, and memory 304). The processor 302 is not limited to a single processing device and may encompass multiple processing devices.

The memory 304 may store, either permanently or temporarily, data, operational software, or other information for the processor 302. The memory 304 may include any one or a combination of volatile or non-volatile local or remote devices suitable for storing information. For example, the memory 304 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 304, a disk, a CD, or a flash drive. In particular embodiments, the software may include an application executable by the processor 302 to perform one or more of the functions described herein.

Figure 4:
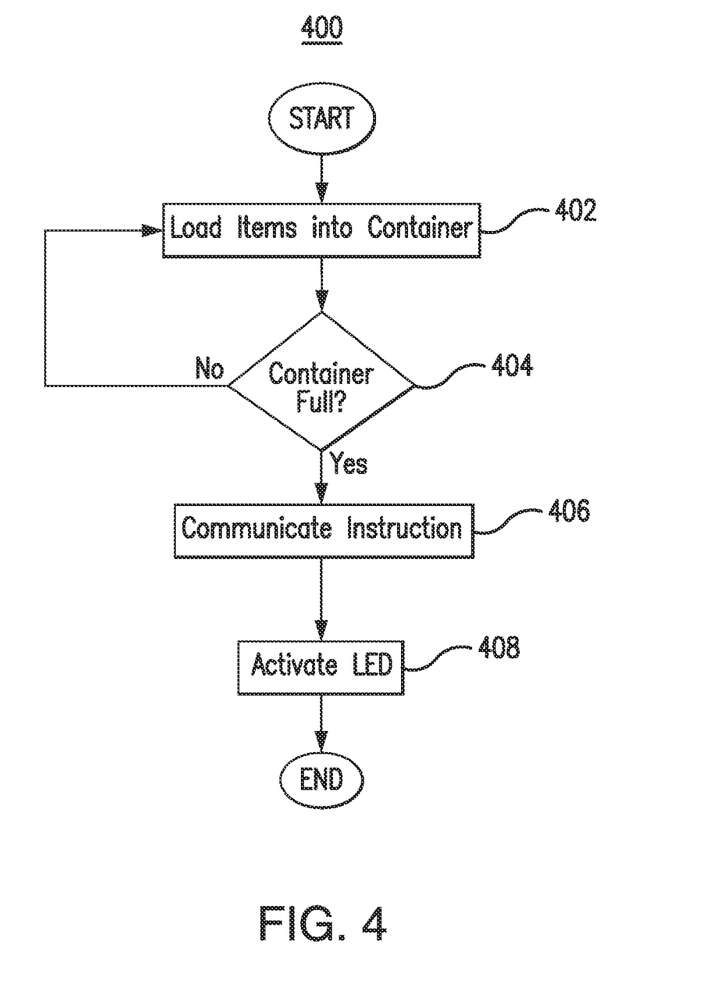
FIG. 4 is a flowchart of an example method performed in the system of FIG. 1.

FIG. 4 is a flowchart of an example method 400 performed in the system 100 of FIG. 1. Various components of the system 100 may perform the steps of the method 400. By performing the method 400, the system 100 may track and respond to a fill status of a container 102.

In block 402, items 108 are loaded into a container 102. For example, the container 102 may be positioned at a loading area in the system 100. Items 108 may be placed or dropped into the container 102 at this loading area. A device 104 may be attached to the container 102. The device 104 may include a fill sensor 210 that detects whether the container 102 is fully loaded with items 108. For example, the fill sensor 210 may include a mechanical switch or may emit an optical beam that can detect when the container 102 is filled.

In block 404, the device 104 determines whether the container 102 is full. For example, if an item 108 breaks an optical beam emitted by the fill sensor 210, or if an item 108 triggers or hits a mechanical switch of the fill sensor 210, then the device 104 may determine that the container 102 is full, otherwise, the device 104 may determine that the container 102 is not full. If the container 102 is not full, then items 108 may continue to be loaded into the container 102 in block 402.

If the container 102 is full, then the device 104 may communicate an indication that the container 102 is full. In response to that indication, the system 100 may communicate an instruction to the device 104 in block 406. For example, the device 104 may communicate a message that the container 102 is full to an anchor 112. The anchor 112 may then communicate the message to the location controller 110. The location controller 110 may communicate an instruction to the device 104 indicating that the container 102 should be moved onto a truck 114 so that the items 108 in the container 102 may be delivered. The instruction may indicate the location of the truck 114 onto which the container 102 should be moved.

In block 408, the device 104 activates the LED 220 in response to the instruction, indicating that the container 102 should be moved onto the truck 114. In some embodiments, the device 104 may activate the LED 220 so that the LED 220 emits light of a particular color (e.g., blue) to indicate that the container 102 is full and should be moved to the truck 114. In some embodiments, the device 104 includes the display 222 that displays the fill status of the container 102 and the location of the truck 114. When a human operator sees the LED 220 and the display 222, the human operator may understand that the container 102 should be moved to the truck 114. The human operator may then move the container 102 to the truck 114. In some embodiments, a robot 106 may autonomously move the container 102 to the truck 114.

Figure 5:
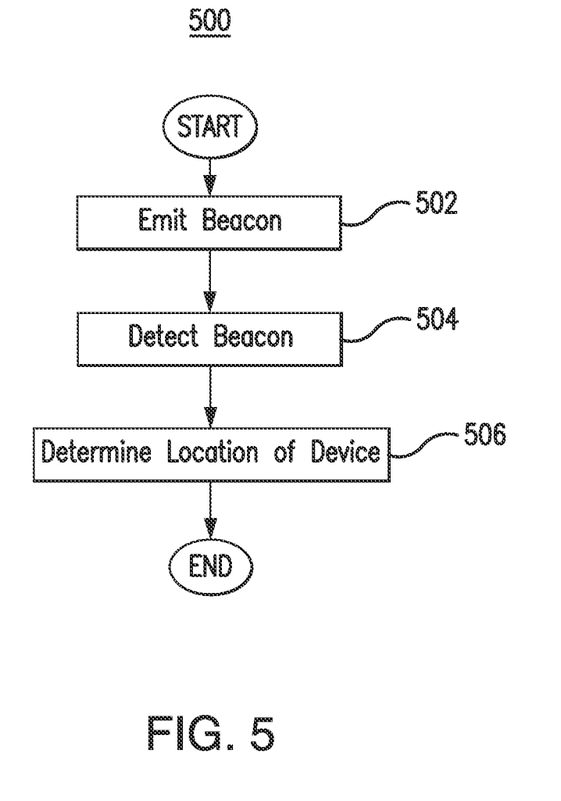
FIG. 5 is a flowchart of an example method performed in the system of FIG. 1.

FIG. 5 is a flowchart of an example method 500 performed in the system 100 of FIG. 1. In particular embodiments, various components of the system 100 perform the steps of the method 500. By performing the method 500, the locations of devices 104 in the system 100 may be determined.

In block 502, a device 104 in the system 100 emits a beacon. For example, the device 104 may include an ultra-wideband radio 208A that emits a beacon. In block 504, one or more anchors 112 detect the beacon emitted by the device 104. The anchors 112 may be ultra-wideband anchors 112 that are positioned around the system 100. Based on the location of the device 104, certain anchors 112 may detect the emitted beacon while other anchors 112 may not detect the emitted beacon.

When an anchor 112 detects the emitted beacon, the anchor 112 may communicate an indication of the emitted beacon to the location controller 110. In block 506, the location controller 110 determines the location of the device 104 based on which anchors 112 reported indications of the emitted beacon. For example, anchors 112 that are positioned near the device 104 may detect the emitted beacon and report to the location controller 110. The location controller 110 may determine the locations of the anchors 112 that detected the emitted beacon. Using the locations of the anchors 112, the location controller 110 may determine the location of the device 104 in the system 100. The location controller 110 may then store or update the location of the device 104 in the system 100.

Figure 6:
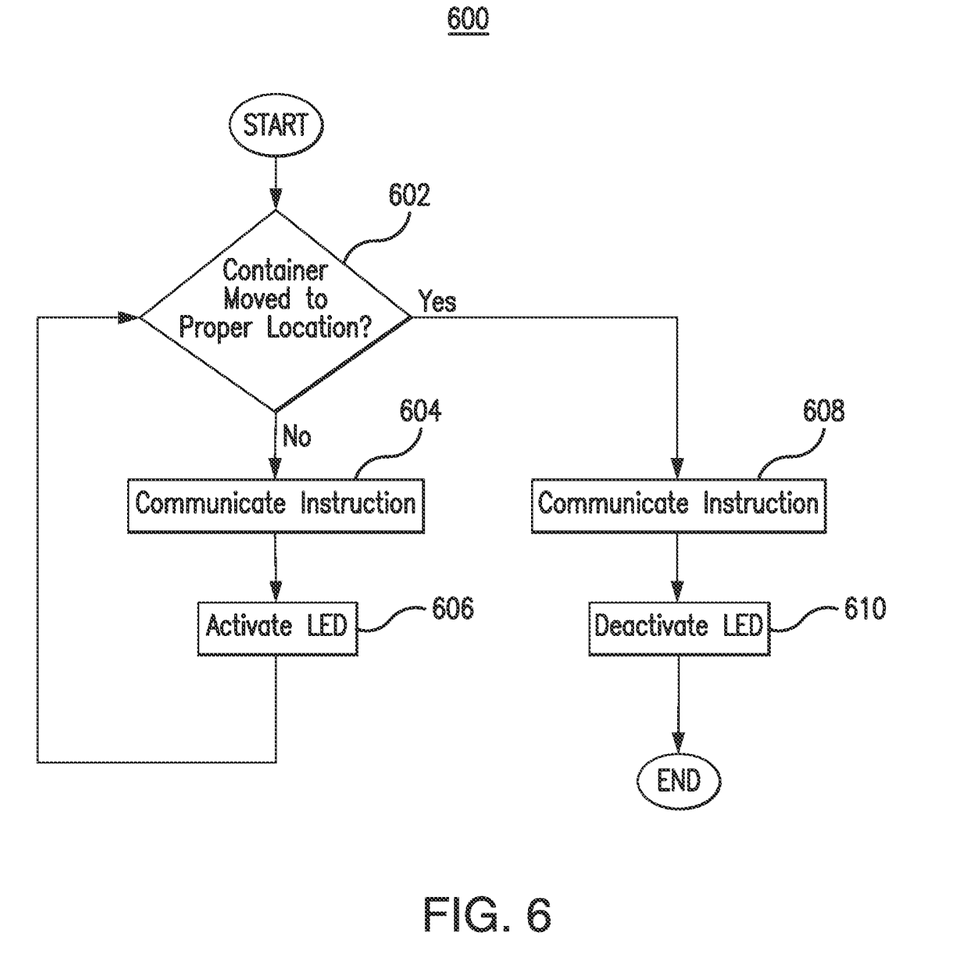
FIG. 6 is a flowchart of an example method performed in the system of FIG. 1.

FIG. 6 is a flowchart of a method 600 performed in the system 100 of FIG. 1. In particular embodiments, various components of the system 100 perform the steps of the method 600. By performing the method 600, the system 100 tracks whether a device 104 or a container 102 have been moved to a proper location.

In block 602, the location controller 110 determines whether the container 102 has been moved to a proper location. For example, the device 104 attached to the container 102 may emit a beacon that the location controller 110 uses to determine the location of the device 104 or the container 102. The location controller 110 may then determine whether the device 104 or the container 102 has been moved to an appropriate location (e.g., for storage or delivery). As another example, if the container 102 or the device 104 are supposed to be moved onto a particular truck 114, then the container 102 or the device 104 may be moved onto a truck 114 by a human operator. The device 104 may then detect a Bluetooth device in the truck 114. The device 104 may use a Bluetooth radio 208B to form a Bluetooth connection with a Bluetooth device in the truck 114. The device 104 may then update its location using the Bluetooth connection. The location controller 110 may determine the truck 114 onto which the device 104 or the container 102 has been loaded. The location controller 110 may then determine whether the device 104 or the container 102 has been loaded onto the correct truck 114.

If the location controller 110 determines that the device 104 or the container 102 have not been loaded onto the correct truck 114, then the location controller 110 may communicate an instruction to the device 104 in block 604. The instruction may indicate that the device 104 is not in its proper location. In response, the device 104 activates the LED 220 in block 606. In some embodiments, the device 104 activates the LED 220 such that the LED 220 emits light of a particular color (e.g., red) to indicate that the device 104 is in an incorrect location. When a human operator or robot 106 sees the light emitted by the LED 220, the human operator or the robot 106 may understand that the container 102 or the device 104 is at the wrong location. The human operator or the robot 106 may then move the container 102 or the device 104 to the correct location (e.g., to the correct truck 114).

After the container 102 has been moved to the proper location, the location controller 110 communicates an instruction to the device 104 in block 608. The instruction may indicate that the device 104 is now at the proper location. In response to the instruction, the device 104 deactivates the LED 220 in block 610. When the LED 220 is deactivated, the LED 220 stops emitting light. In some embodiments, the device 104 may change the color of the LED 220 instead of deactivating the LED 220 in block 610. The different color may indicate that the device 104 and the container 102 have moved to the correct location. In this manner, the device 104 indicates that the device 104 and the container 102 are located in the correct location (e.g., the correct truck 114).

Figure 7:
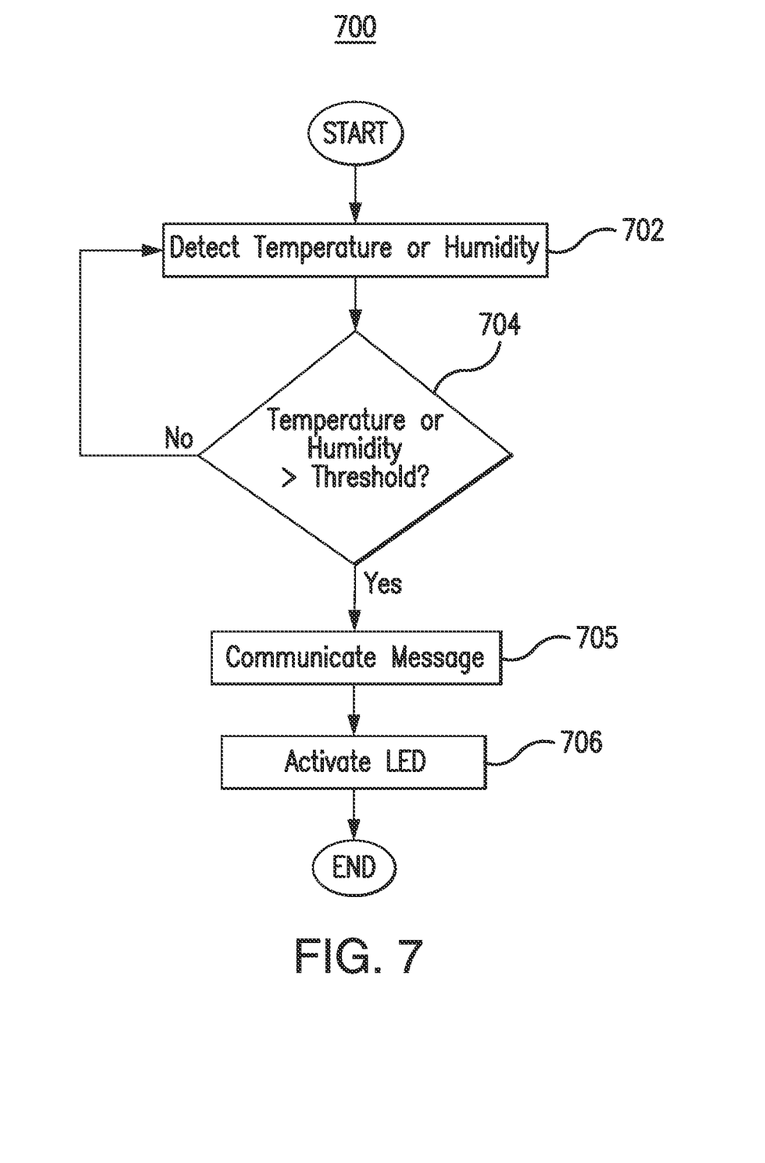
FIG. 7 is a flowchart of an example method performed in the system of FIG. 1.

FIG. 7 is a flowchart of an example method 700 performed in the system 100 of FIG. 1. In particular embodiments, the device 104 performs the method 700. By performing the method 700, the system 100 tracks and monitors the environment around the device 104 or a container 102 to which the device 104 is attached.

In block 702, the humidity sensor 212 and the temperature sensor 214 of the device 104 detect a temperature or humidity of the environment around the device 104. The device 104 may store or track the detected temperature or humidity. In block 704, the device 104 may determine whether the detected temperature or humidity exceeds a threshold. If the detected temperature or humidity do not exceed a threshold, then the device 104 may continue detecting the temperature or humidity.

If the detected temperature or humidity exceeds a threshold, then the device 104 communicates a message to the location controller 110 (e.g., through a connection with an anchor 112) to indicate that the temperature or humidity has exceeded the threshold in block 705. The location controller 110 may then inform an administrator so that appropriate action can be taken. When the device 104 is in a location where it is not possible to communicate with the location controller 110, the device 104 may log the detected temperature or humidity (e.g., in the memory 204) so that the device 104 may prepare and communicate the message to the location controller 110 when the device 104 has re-established communication with the location controller 110. The device 104 also activates the LED 220 in block 706. In certain embodiments, the device 104 activates the LED 220 such that the LED 220 emits light of a particular color (e.g., orange) to indicate that the items 108 in the container 102 to which the device 104 is attached have been exposed to undesirable environmental elements. For example, the light may indicate that the items 108 in the container 102 have been exposed to undesirably high levels of heat or undesirably high levels of humidity. When a human operator sees the light emitted by the LED 220, the human operator may discard the items 108 in the container 102.

Figure 8:
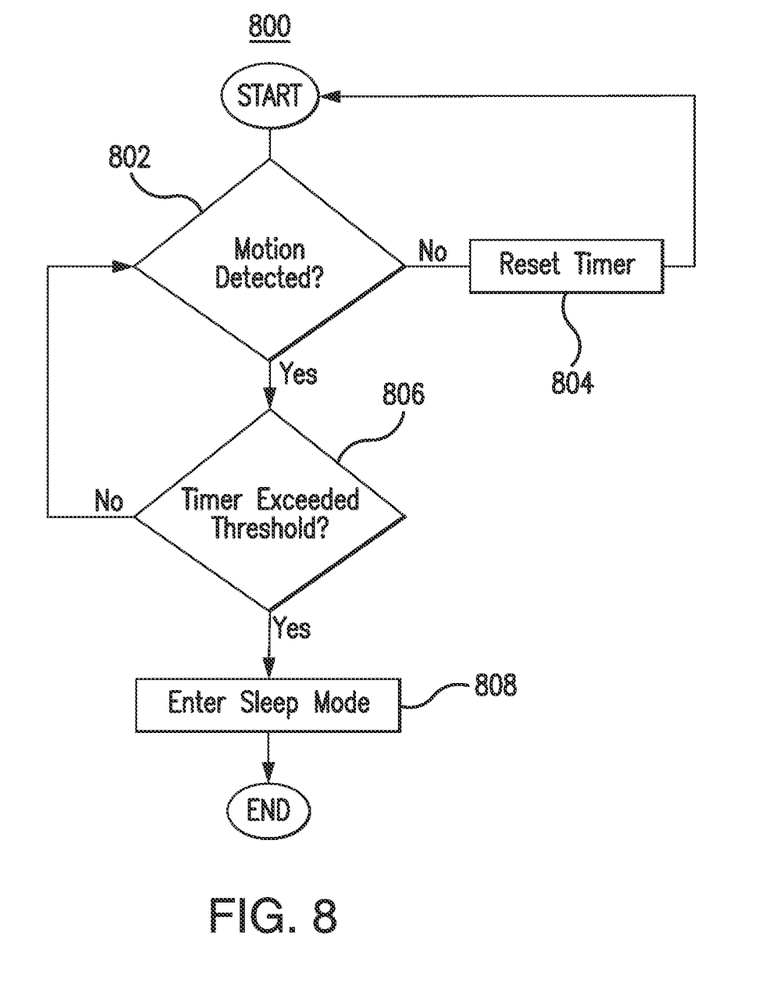
FIG. 8 is a flowchart of an example method performed in the system of FIG. 1.

FIG. 8 is a flowchart of an example method 800 performed in the system 100 of FIG. 1. In particular embodiments, the device 104 performs the method 800. By performing the method 800, the device 104 may conserve electrical energy.

In block 802, the device 104 detects whether the device 104 is moving. The device 104 includes a motion sensor 216 that detects when the device 104 is moving or staying still. If information from the motion sensor 216 indicates that the device 104 is not moving, then the device 104 resets a timer in block 804 and continues to monitor the motion of the device 104. If the information from the motion sensor 216 indicates that the device 104 is moving, then the device 104 determines whether the timer has exceeded a threshold in block 806. If the timer does not exceed the threshold, then the device 104 returns to block 802 to monitor the motion or non-motion of the device 104. In this manner, the device 104 does not enter sleep mode if the device 104 starts moving briefly because the device 104 is bumped.

If the timer has exceeded the threshold, then the device 104 enters a sleep mode in block 808. During the sleep mode, the device 104 may deactivate or power down one or more of the components of the device 104 (e.g., the radios 208, the LED 220, display 222, and the various sensors in the device 104). In this manner, the device 104 conserves the electrical energy in the battery 206 when the device 104 is in motion. The device 104 may wake up from the sleep mode when the device 104 stops moving. The device 104 may then update its location with the location controller 110.

In some embodiments, the device 104 enters sleep mode when the device has been stationary for a period exceeding a threshold. For example, if the motion sensor 216 detects that the device is moving in block 802, then the device 104 resets the timer in block 804. If the motion sensor 216 detects that the device is not moving in block 802 and the timer has exceeded a threshold in block 806, then the device 104 enters the sleep mode. When the motion sensor 216 detects that the device 104 is moving again, the device 104 may awaken from the sleep mode.

Figure 9:
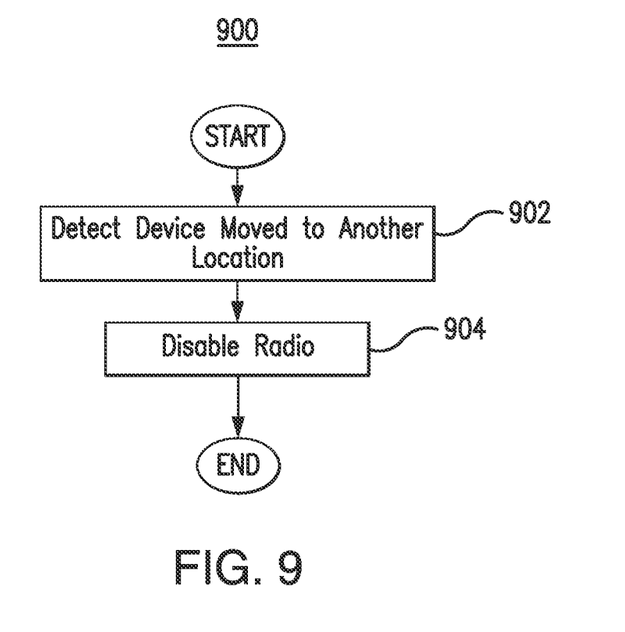
FIG. 9 is a flowchart of an example method performed in the system of FIG. 1.

FIG. 9 is a flowchart of an example method 900 performed in the system 100 of FIG. 1. In particular embodiments, the device 104 performs the method 900. By performing the method 900, the device 104 conserves electrical energy in the device 104.

In block 902, the device 104 detects whether the device 104 has moved to another location (e.g., onto a truck 114). In some embodiments, the device 104 may make this determination by detecting whether a Bluetooth radio 208B detects an available Bluetooth connection in the truck 114. In some embodiments, the device 104 makes this determination by detecting whether an ultra-wideband radio 208A in the device 104 has moved out of range of an ultra-wideband network in the system 100.

In block 904, the device 104 disables a radio 208 of the device 104 when the device 104 detects that the device 104 has moved to the other location (e.g., a truck 114). For example, the device 104 may disable the ultra-wideband radio 208A when the device 104 detects that the device 104 has moved to the truck 114. By disabling the ultra-wideband radio 208A, the device 104 reduces the electrical energy consumed by the device 104.

In summary, the device 104 attaches to a container 102 and provides several features that assist the robots 106 in tracking the location of the container 102 in a building (e.g., a warehouse). The device 104 may also include radios 208 (e.g., an ultra-wideband radio and a Bluetooth radio) that allow the device 104 to report its location to a location tracking system. The reported location may be used to guide robots 106 to the container 102. Moreover, the device 104 may include various sensors (e.g., a fill sensor 210, humidity sensor 212, temperature sensor 214, motion sensor 216, etc.) that allow the device 104 to detect certain aspects of the container 102 or the environment around the container 102. Additionally, the device 104 includes a lighting system that emits lights indicating the status of the container 102. For example, if the container 102 has been moved to an incorrect location, the lighting system may emit light of a first color, and if the container 102 has been subjected to high temperatures, then the lighting system may emit light of a second, different color.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure describes a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
a plurality of anchors positioned in a building;
a location controller for the building;
a container arranged to store items; and
a device attached the container, wherein the device comprises:
a radio arranged to emit a signal detectable by the plurality of anchors, wherein the location controller is configured to determine a location of the device in the building based on the signal;
a sensor arranged to detect a fill level of the container; and
a light emitting diode (LED), wherein the location controller is further configured to communicate, based on the fill level or the location of the device in the building, a first instruction to the device indicating that the device should be moved to a first truck, wherein the LED is arranged to emit light of a first color in response to the first instruction.

2. The system of claim 1, wherein:
the location controller is further configured to communicate a second instruction to the device in response to determining that the device has moved to a second truck different from the first truck; and
the light is further arranged to emit light of a second color in response to the second instruction.

3. The system of claim 1, wherein the device further comprises a temperature sensor arranged to detect an ambient temperature around the device.

4. The system of claim 1, wherein the device further comprises a wireless charger arranged to charge the device when the device is at the location, and wherein the container is loaded with items at the location.

5. A system comprising:
a location controller for a building;
a container arranged to store items; and
a device attached to the container, wherein the device comprises:
a first radio arranged to emit a signal, wherein the location controller is configured to determine a first location of the device in the building based on the signal; and
a light emitting diode (LED), wherein the location controller is further configured to communicate, based on the first location of the device in the building, a first instruction to the device indicating that the device should be moved to a second location, wherein the LED is arranged to emit light of a first color in response to the first instruction.

6. The system of claim 5, further comprising a plurality of anchors positioned in the building, wherein the first location is determined based on which anchors of the plurality of anchors detected the signal.

7. The system of claim 5, wherein:
the location controller is further configured to communicate a second instruction to the device in response to determining that the device has moved to a third location different from the second location; and
the LED is further arranged to emit light of a second color in response to the second instruction.

8. The system of claim 5, wherein the device further comprises a temperature sensor arranged to detect an ambient temperature around the device.

9. The system of claim 8, wherein the LED is arranged to activate in response to the temperature sensor detecting an ambient temperature that exceeds a threshold.

10. The system of claim 5, wherein the device further comprises a wireless charger arranged to charge the device when the device is at the first location, and wherein the container is loaded with items at the first location.

11. The system of claim 5, wherein the device further comprises a motion sensor arranged to detect whether the device is moving, and wherein the device enters a sleep mode in response to the motion sensor detecting that the device has been moving for a period of time exceeding a threshold.

12. The system of claim 5, wherein the device further comprises a second radio arranged to detect that the device has moved to the second location.

13. The system of claim 12, wherein the first radio is disabled in response to the second radio detecting that the device has moved to the second location.

14. A method comprising:
emitting, by a first radio of a device attached to a container arranged to store items, a signal;
determining, by a location controller for a building, a first location of the device in the building based on the signal;
determining, by the location controller and based on the first location of the device in the building, that the device should be moved to a second location;
communicating, by the location controller, a first instruction to the device indicating that the device should be moved to the second location; and
activating, based on the first instruction, a light emitting diode (LED) of the device such that the LED emits light of a first color.

15. The method of claim 14, wherein the first location is determined based on which anchors of a plurality of anchors positioned in the building detected the signal.

16. The method of claim 14, further comprising:
communicating, by the location controller, a second instruction to the device in response to determining that the device has moved to a third location different from the second location; and
emitting, by the LED, light of a second color in response to the second instruction.

17. The method of claim 14, further comprising detecting, by a temperature sensor of the device, an ambient temperature around the device.

18. The method of claim 17, further comprising activating the LED in response to the temperature sensor detecting an ambient temperature that exceeds a threshold.

19. The method of claim 14, further comprising charging, by a wireless charger of the device, the device when the device is at the first location, and wherein the container is loaded with items at the first location.

20. The method of claim 14, further comprising:
   detecting, by a motion sensor of the device, whether the device is moving; and
   entering, by the device, a sleep mode in response to the motion sensor detecting that the device has been moving for a period of time exceeding a threshold.

* * * * *

UNITED STATES PATENT AND TRADEMARK OFFICE
CERTIFICATE OF CORRECTION

| | | |
|---|---|---|
| PATENT NO. | : 12,052,636 B1 | Page 1 of 1 |
| APPLICATION NO. | : 17/935986 | |
| DATED | : July 30, 2024 | |
| INVENTOR(S) | : Roman Shmulevich et al. | |

It is certified that error appears in the above-identified patent and that said Letters Patent is hereby corrected as shown below:

On the Title Page

Item (72), the name -- Nicholas G. Dyshaw Stillwater, MN -- should be added.

Signed and Sealed this
Eighth Day of July, 2025

Coke Morgan Stewart
*Acting Director of the United States Patent and Trademark Office*